（12）United States Patent
Garg et al.

(10) Patent No.: US 7,957,310 B1
(45) Date of Patent: *Jun. 7, 2011

(54) NETWORK-BASED NOTIFICATION OF VOICE MAIL

(75) Inventors: Amit Garg, Freehold, NJ (US); Rajeev B. Patil, Holmdel, NJ (US); Jeffrey L. Tuttle, Hazlet, NJ (US)

(73) Assignee: AT&T Intellectual Property II, LLP, Atlanta, GA (US)

( * ) Notice: Subject to any disclaimer, the term of this patent is extended or adjusted under 35 U.S.C. 154(b) by 906 days.

This patent is subject to a terminal disclaimer.

(21) Appl. No.: 11/906,733

(22) Filed: Oct. 3, 2007

(51) Int. Cl.
*H04L 12/56* (2006.01)
*H04J 1/16* (2006.01)

(52) U.S. Cl. ...... 370/252; 370/352; 370/401; 379/88.17

(58) Field of Classification Search .................. 370/252, 370/352–356, 400, 401; 379/88.17
See application file for complete search history.

(56) References Cited

U.S. PATENT DOCUMENTS

| | | | |
|---|---|---|---|
| 5,311,576 A | 5/1994 | Brunson | |
| 5,535,264 A | 7/1996 | Starr | |
| 5,652,784 A | 7/1997 | Blen | |
| 6,104,786 A | 8/2000 | Gibilisco | |
| 6,385,308 B1 | 5/2002 | Cohen | |
| 6,647,109 B1 * | 11/2003 | Henderson | 379/219 |
| 2004/0120475 A1 | 6/2004 | Bauer | |
| 2004/0136505 A1 | 7/2004 | Garg | |
| 2004/0136510 A1 * | 7/2004 | Vander Veen | 379/88.22 |
| 2005/0153729 A1 | 7/2005 | Logan | |

* cited by examiner

*Primary Examiner* — John Pezzlo
(74) *Attorney, Agent, or Firm* — Akerman Senterfitt; Michael K. Dixon

(57) ABSTRACT

At least one exemplary embodiment of the present invention includes a method comprising the activities of detecting, via a public switched telephone network, a caller's dialing of a telephone number; and after said detecting activity, and prior to call setup, providing to the caller a voicemail status notification. At least one exemplary embodiment of the present invention includes a method comprising the activities of placing a telephone call via a public switched telephone network, and receiving, via the public switched telephone network, a voicemail status notification after placing the telephone call and prior to call setup. It is emphasized that this abstract is provided to comply with the rules requiring an abstract that will allow a searcher or other reader to quickly ascertain the subject matter of the technical disclosure. This abstract is submitted with the understanding that it will not be used to interpret or limit the scope.

21 Claims, 3 Drawing Sheets

NETWORK-BASED NOTIFICATION OF VOICE MAIL

BACKGROUND

Many telephone service providers (TSP's) offer a network-based voicemail service for their customers, so that a caller can leave a voicemail message for a customer of the TSP. When provided by a Local Exchange Carrier (LEC), these voicemail services typically utilize Simplified Message Desk Interface (SMDI) links to transmit a message-waiting notification between the LEC's switch and the called subscriber's line. In one implementation, a message-waiting notification creates a stutter dial tone heard by the customer when they attempt to make a call. In another implementation, a message-waiting notification actuates a Message Waiting Indicator (MWI), which is a small LED usually provided on either the customer's telephone or on a small box connected to the telephone via an RJ-11 connector.

TSP's other than the customer's LEC are usually at a disadvantage in providing message waiting notification to the customer since SMDI links can be very costly to install. Such links typically require a dedicated connection from the non-LEC TSP to the local switch serving the customer of the non-LEC TSP, that switch operated by the customer's LEC. Moreover, SMDI links can be very difficult to maintain, because, among other reasons, the non-LEC TSP can need the cooperation of the LEC, which might be a business competitor of the non-LEC TSP.

SUMMARY

At least one exemplary embodiment of the present invention includes a method comprising the activities of detecting, via a public switched telephone network, a caller's dialing of a telephone number; and after said detecting activity, and prior to call setup, providing to the caller a voicemail status notification.

At least one exemplary embodiment of the present invention includes a method comprising the activities of detecting, via a public switched telephone network, a caller's dialing of a telephone number; and after said detecting activity, and prior to provision of a ring tone, providing to the caller a voicemail status notification.

At least one exemplary embodiment of the present invention includes a method comprising the activities of placing a telephone call via a public switched telephone network, and receiving a voicemail status notification from a network voicemail service after placing the telephone call and prior to call setup.

At least one exemplary embodiment of the present invention includes a method comprising the activities of placing a telephone call via a public switched telephone network; and receiving, via the public switched telephone network, a voicemail status notification after placing the telephone call and prior to receiving a ring tone.

BRIEF DESCRIPTION OF THE DRAWINGS

The invention and its wide variety of potential embodiments will be readily understood via the following detailed description of certain exemplary embodiments, with reference to the accompanying drawings in which.

DETAILED DESCRIPTION

According to an exemplary embodiment of a method of the present invention, once a new voicemail message is received for a customer at a network voicemail service, a network, such as a telephone network, e.g., the public switched telephone network, can detect a customer's dialing of a telephone number. The telephone number can be any telephone number. Alternatively, the telephone number can be a predetermined number. After detecting the dialing of the telephone number, and prior to call setup, the network can provide to the customer, and/or cause to be provided to the customer, a voicemail status notification. The voicemail status notification can indicate that a new voicemail message is waiting, the priority of the new voicemail message, the caller ID number and/or name of the party who recorded the new voicemail message, the number of saved voicemail messages, the remaining capacity in the customer's voicemail box, etc.

Figure 1:
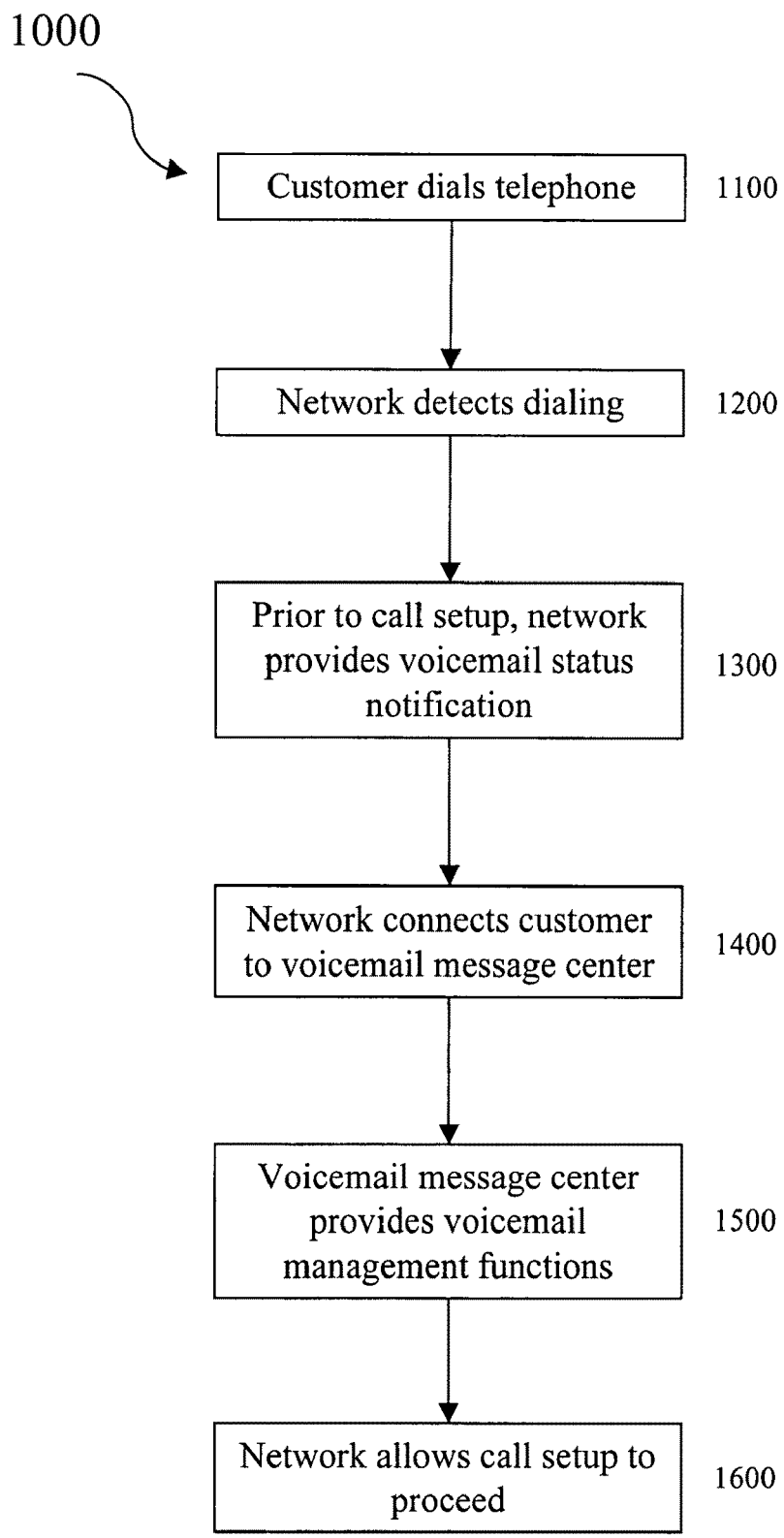
FIG. 1 is a flow diagram of an exemplary embodiment of a method 1000 of the present invention.

FIG. 1 is a flow diagram of an exemplary embodiment of a method 1000 of the present invention. Note that although various activities are presented in a numbered sequence, and are connected with arrows to an exemplary embodiment of method 1000, there is no general requirement that the activities be performed in any particular order or any particular number of times, or that all activities be performed. Moreover, any activity can be performed automatically and/or manually.

At activity 1100, a customer can dial a number on a telephone coupled to a telephone network, such as a public switched telephone network (PSTN). The telephone number can be any (or nearly any) telephone number, such as the telephone number of a family member, friend, business, etc. Alternatively, in certain exemplary embodiments, the telephone number can be a predetermined number, such as the telephone number of a voicemail messaging center.

At activity 1200, the network (including appropriate components of the network) can detect that the customer has dialed a telephone number, and can cause call setup to the dialed number to be postponed. In certain exemplary embodiments, if certain predetermined numbers are dialed, such as 911 or 0, then the network can allow call setup to proceed without postponement.

At activity 1300, prior to call setup, the network can provide, or cause to be provided, voicemail status notification. In certain exemplary embodiments, the voicemail status notification can be as simple as one or more tones, sounds, and/or recordings indicating that there is a new voicemail message waiting. In certain exemplary embodiments, the voicemail status notification can indicate specific message information, such as the message date, message time, messenger's ANI and/or caller ID number, messenger's name, which telephone line the messenger dialed (if the customer has multiple lines), for whom the messenger designated the message (when multiple users are associated with a single customer telephone number, such as in the case of a family), etc. In certain exemplary embodiments, the voicemail status notification can indicate general message management information, such as the number of saved messages, the amount of storage space remaining for messages, the number of messages designated for deletion, etc.

In certain exemplary embodiments, provision of the voicemail status information to the customer can be staged. That is, initially a tone, sound, and/or recording. For instance, if the voicemail status information is positive (e.g., a new message has arrived and/or voicemail messages are stored), the tone, sound, and/or recording can a message to the effect of "you have voicemail", can be provided to indicate that a new voicemail message is awaiting. If the customer presses a predetermined key or says a predetermined word or phrase, such as "more", additional information about the awaiting voicemail (s) can be provided.

In certain exemplary embodiments, the tone, sound, and/or recording of a voicemail status notification and/or voicemail status information can be user selectable and/or user recordable. In certain exemplary embodiments, various parameters of the tone, sound, and/or recording, such as frequency, volume, speed, pitch, etc., can be user selectable and/or user controllable.

In certain exemplary embodiments, the customer can be offered the option of hearing a voicemail status notification. The customer can accept by, for example, pressing a particular key, such as the * or # key, on their telephone keypad, or by speaking a particular word or phrase, such as "status" or "update". If the customer declines, such as by pressing a designated declination key, by saying "no" or "proceed", or by not responding within a predetermined time period, call setup can be allowed to proceed.

In certain exemplary embodiments, the customer can be offered the option of connecting to a messenger's telephone number. That is, the customer can be given the option to connect to the telephone number of someone who left a message, either upon receiving the voicemail status notification and/or after listening to the message. The customer can accept by, for example, pressing a particular key, such as the * or # key, on their telephone keypad, or by speaking a particular word or phrase, such as "connect". If the customer declines, such as by pressing a designated declination key, by saying "no", or by not responding within a predetermined time period, call setup can be allowed to proceed.

At activity 1400, the customer can be connected to the voicemail messaging center, which, at activity 1500, can interact with the customer to perform well known voicemail management functions, such as playing any recorded voicemail messages, saving voicemail messages, deleting voicemail messages, recording and/or changing greetings, etc. Connection to the voicemail messaging center can be automatic, or can require that the customer press a predetermined key or say a predetermined word or phrase, such as "play" or "retrieve".

At activity 1600, upon completion of the customer's interaction with the voicemail messaging center, call setup can be allowed to proceed. If the customer hangs-up prior to call setup proceeding, completion, and/or declination by the network and/or called number's LEC, a "wake-up" call or the like can be provided to the customer to remind them that their originally dialed call is ready to be placed. During such a wake-up call, the ANI, caller ID number, and/or caller ID name associated with the dialed number, can be announced to remind the customer who they were originally trying to call.

In certain exemplary embodiments, the customer can press a key or say a predetermined word or phrase, such as "cancel" prior to hanging up from the voicemail messaging center and/or the network voicemail service, or upon receiving the wake-up call, to cancel call setup from proceeding for the originally dialed number.

In certain exemplary embodiments, if a new voicemail message arrives while the customer is interacting with the voicemail message center, a voicemail status notification can be provided, either while the customer is interacting, and/or after the customer has completed the interaction.

In certain exemplary embodiments, if a new voicemail message arrives while the customer is connected to a dialed number, a voicemail status notification can be provided, either while the customer is connected, and/or via a wake-up call after customer has disconnected.

Thus, various exemplary embodiments can provide one or more methods for a non-LEC TSP to cause a telephonic voicemail status notification to be provided to a customer without utilizing a SMDI link.

In certain embodiments, because the telephonic voicemail status notification can alert a customer to a voicemail that has arrived during a call, the customer can be more likely to become promptly aware that a new voicemail message is awaiting. That is, the customer need not search for a telephone and listen for a stutter dial tone or check to see if a message waiting indicator is activated in order to become aware of a waiting voicemail message.

Moreover, the voicemail status notification can contain more informational content that merely whether a voicemail message is waiting. For example, the voicemail status notification can indicate call information, such as the date, time, calling party number, caller ID name, etc. associated with the call. Also, the voicemail status notification can indicate which of several subscriber lines the message was received on, a caller-chosen priority for the message, and/or a caller-chosen recipient for the message. Further, the voicemail status notification can indicate voicemail management information, such as the number of new messages waiting, the number of stored voicemail messages, and/or the storage capacity the customer has remaining. As another example, the voicemail status notification can indicate the fact that a voicemail message was rejected or cut-off, for instance because the customer's storage capacity was exceeded, and/or call information relating to the rejected or cut-off voicemail message.

In certain embodiments, the messenger's caller ID number can be "recognized" as associated with a predetermined message priority, a predetermined notification, and/or predetermined notification parameters. The possibilities here are nearly endless. For example, when a message is recorded by the customer's mother, the voicemail status notification can announce that fact in a loud, shrill voice. If a voicemail message was left by the customer's boss, a deep "foghorn" notification can be provided. If a voicemail message was left by the customer's friend, a few bars of a favorite melody can be played. If a voicemail message was provided by someone the customer does not want to be reminded of, the message can be given a low priority, not reported unless the customer interacts with the messaging center, automatically deleted, and/or communicated via a voicemail status notification only when the customer is using a telephone on a certain predetermined telephone line.

Therefore, a voicemail status notification can have any of numerous capabilities and/or configurations, ranging from a very basic, unobtrusive tone or sound to a more sophisticated, multi-level message information system.

Figure 2:
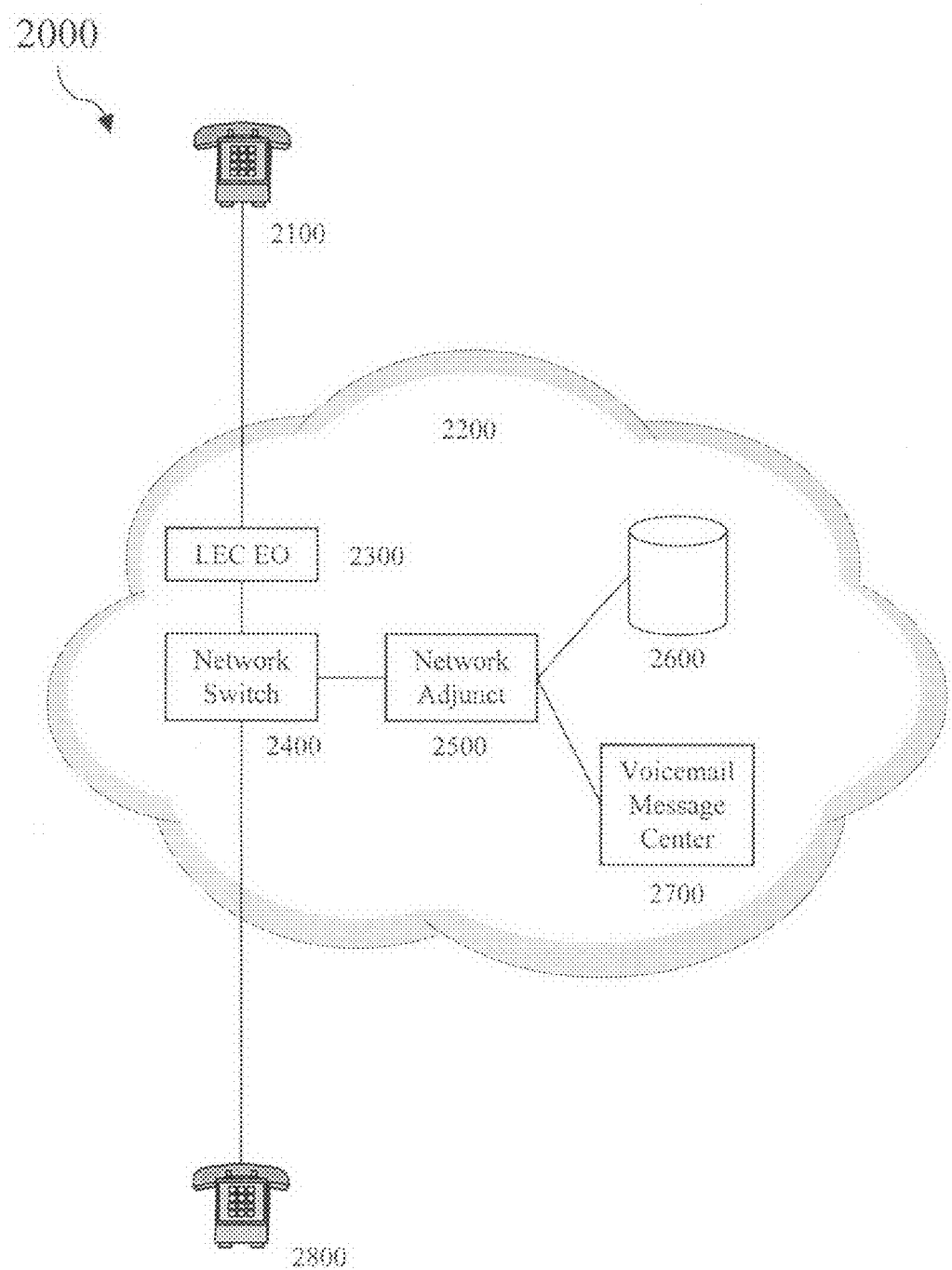
FIG. 2 is a block diagram of an exemplary embodiment of a system 2000 of the present invention.

FIG. 2 is a block diagram of an exemplary embodiment of a system 2000 of the present invention. As an initial matter, it suffices to say that, using the description of method 1000, one of ordinary skill in the art can implement the functionality of method 1000 via system 2000 utilizing any of a wide variety of well-known architectures, hardware, protocols, and/or software. Thus, the following description of system 2000 can be viewed as illustrative, and unless specified otherwise, should not be construed to limit the implementation of method 1000 and/or the scope of any claims attached hereto.

System 2000 can comprise a calling party's telephone 2100, which can be connected to a called party's telephone 2600 via a network 2200 of any type, including for example, a public switch telephone network (PSTN), a private network, a cellular network, and/or the Internet. Within and/or connected to network 2200 can be a LEC end office (EU) 2300, a network switch 2400, a network adjunct 2500, which can be coupled to one or more databases 2600 and/or a voicemail message service or center 2700. Thus, network 2200 and/or components of network 2200 can cause calling party's telephone 2100 to be connected to the called party's telephone 2800.

In certain embodiments, a voicemail message can be left by a messenger for a subscriber on a voicemail system resident on, for example, voicemail message center 2700, which can send a status message to network adjunct 2500. Upon receiving the status message, network adjunct 2500 can update the subscriber's status in database 2600.

The subscriber can call voicemail message center 2700, perhaps by dialing a toll-free telephone number. LEC EO 2300 can receive and route the call to network switch 2400. Upon receiving the call, network switch 2400 can identify that the calling party is a subscriber and that the dialed number is the voicemail message center 2700, and can route the call to network adjunct 2500. In certain alternative embodiments, even if the originally called number is not that of voicemail messaging center 2700, network switch 2400 can nonetheless route the call to network adjunct 2500. Upon receiving the call, network adjunct 2500 can locate the subscriber's status record in database 2600, and can play and/or provide a voicemail status notification, such as a tone, sound, melody, recording, and/or message, etc. (e.g., "you have 2 new voicemail messages").

Upon receiving the voicemail status notification, the subscriber can request and/or be automatically connected to voicemail messaging center 2700. Network adjunct 2500 can then set up a call to voicemail messaging center 2700 and bridge the subscriber and voicemail messaging center 2700. Upon receiving the bridged call, the voicemail messaging center 2700 can prompt the subscriber to login.

After properly logging in, the subscriber can listen to and/or manage their voicemail messages and then can disconnect from voicemail messaging center 2700. Upon recognizing the disconnection, voicemail messaging center 2700 can send a status message to network adjunct 2500. Upon receiving the status message, network adjunct 2500 can update the subscriber's status in database 2600. If the caller did not originally dial the voicemail messaging center 2700, network adjunct 2500 can route the call to the originally dialed number. If appropriate, network adjunct 2500 can initiate a wake-up call to the subscriber.

Various levels of security can be implemented in various exemplary embodiments of method 1000 and/or system 2000. For example, in certain embodiments, one or more components of system 2000 can request, validate, accept, and/or relay a keyed and/or spoken userID and/or password in communications with the customer, network 2200, LEC EO 2300, network switch 2400, network adjunct 2500, database (s) 2600, and/or voicemail message center 2700. In certain embodiments, system 2000 can incorporate a biometric sensing and/or identification capability, such as via a voice-based biometric device to verify the user to whom it will provide voicemail information. In certain embodiments, communications between calling party's telephone 2100, network 2200, LEC EO 2300, network switch 2400, network adjunct 2500, database(s) 2600, and/or voicemail message center 2700 can be secure, encrypted, and/or validated.

Certain exemplary embodiments of system 2000, network 2200, LEC EO 2300, network switch 2400, network adjunct 2500, database(s) 2600, and/or a voicemail message center 2700 can be implemented as described in U.S. Pat. No. 6,385, 308 (Cohen), which is incorporated herein by reference in its entirety. For example, in certain exemplary embodiments, various component of network 2200, such as LEC EO 2300, network switch 2400, network adjunct 2500, and/or voicemail message center 2700, can be implemented in an intelligent switching system, e.g., the 4ESS* switching system manufactured and sold by Lucent Technologies, Inc., 600 Mountain Avenue, Murray Hill, N.J., 07964. The switching system can perform certain specialized services in response to instructions from within the switching system and/or from an outside processor and associated database. The outside processor can be an adjunct processor, such as that described in U.S. Pat. No. 5,311,576, which is incorporated herein by reference in its entirety. Such an adjunct processor can communicate with the switching system and/or provide switching commands for call flows for various special telephone services, e.g. voicemail status notification executed by the switching system and the like.

Figure 3:
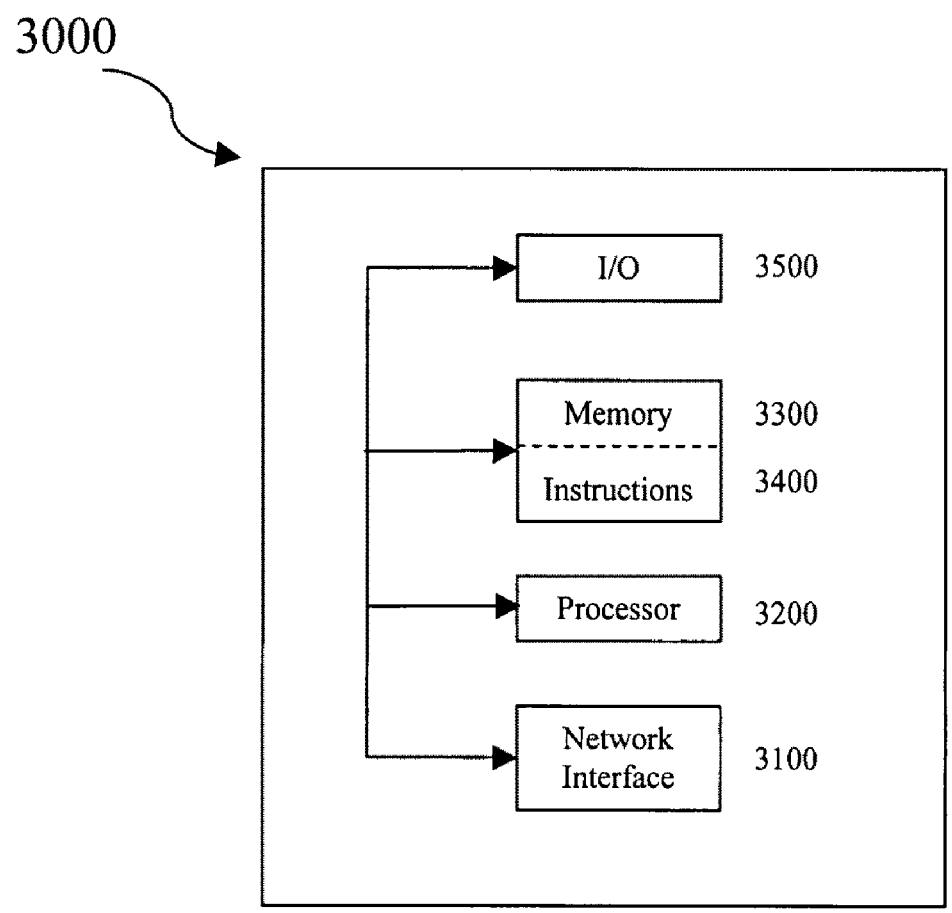
FIG. 3 is a block diagram of an exemplary embodiment of a information device 3000 of the present invention.

FIG. 3 is a block diagram of an exemplary embodiment of an information device 3000 of the present invention. Information device 3000 can represent a LEC EO 2300, network switch 2400, network adjunct 2500, voicemail message center 2700, an intelligent switching system, an outside processor, and/or an adjunct processor, etc., as described in connection with system 2000, above.

Information device 3000 can include well-known components such as one or more communication interfaces 3100, one or more processors 3200, one or more memories 3300 containing instructions 3400, and/or one or more input/output (I/O) devices 3500, etc.

In various embodiments, communication interface 3100 can be and/or include a bus, connector, network adapter, wireless network interface, wired network interface, modem, radio receiver, transceiver, and/or antenna, etc.

Each processor 3200 can be a commercially available general-purpose microprocessor. In certain embodiments, the processor can be an Application Specific Integrated Circuit (ASIC) or a Field Programmable Gate Array (FPGA) that has been designed to implement in its hardware and/or firmware at least a part of a method in accordance with an embodiment of the present invention.

Memory 3300 can be coupled to processor 3200 and can comprise any device capable of storing analog or digital information, such as a hard disk, Random Access Memory (RAM), Read Only Memory (ROM), flash memory, a compact disk, a digital versatile disk (DVD), a magnetic tape, a floppy disk, and any combination thereof. Memory 3300 can also comprise a database, an archive, and/or any stored data and/or instructions. For example, memory 3300 can store instructions 3400 adapted to be executed by processor 3200 according to one or more activities of a method of the present invention.

Instructions 3400 can be embodied in software, which can take any of numerous forms that are well known in the art. Instructions 3400 can control operation of VID 3000 and/or one or more other devices, systems, or subsystems.

Input/output (I/O) device 3500 can be an audio and/or visual device, including, for example, a monitor, display, indicator, light, keyboard, keypad, touchpad, pointing device, microphone, speaker, telephone, fax, video camera, camera, scanner, and/or printer, including a port to which an I/O device can be attached, connected, and/or coupled.

Although the invention has been described with reference to specific embodiments thereof, it will be understood that numerous variations, modifications and additional embodiments are possible, and accordingly, all such variations, modifications, and embodiments are to be regarded as being within the spirit and scope of the invention. Also, references specifically identified and discussed herein are incorporated by reference as if fully set forth herein. Accordingly, the drawings and descriptions are to be regarded as illustrative in nature, and not as restrictive.

What is claimed is:

1. A method for providing a voicemail status notification, the method comprising:
providing to a caller the voicemail status notification, wherein the voicemail status notification is provided to the caller after detecting, via a public switched telephone network, a dialing of a detected dialed telephone number by the caller, wherein the detected dialed telephone number is not a calling-card number or a voicemail number, and wherein the voicemail status notification is provided prior to setting up a call to the detected dialed telephone number.

2. The method of claim 1, further comprising, prior to setting-up a call to the detected dialed telephone number, providing to the caller an option to hear the voicemail status notification.

3. The method of claim 1, further comprising, prior to setting-up a call to the detected dialed telephone number, providing to the caller an option to connect to a network voicemail service.

4. The method of claim 1, further comprising, prior to setting-up a call to the detected dialed telephone number, providing to the caller an option to hear a new voicemail message.

5. The method of claim 1, further comprising, prior to setting-up a call to the detected dialed telephone number, providing to the caller an option to hear a stored voicemail message.

6. The method of claim 1, further comprising, prior to setting-up a call to the detected dialed telephone number, providing to the caller a new voicemail message.

7. The method of claim 1, further comprising, after setting-up a call to the detected dialed telephone number, providing to the caller an option to connect to a network voicemail service.

8. The method of claim 1, further comprising, after a connection to a network voicemail service, providing to the caller an option to connect to the detected dialed telephone number.

9. The method of claim 1, further comprising, after a connection to a network voicemail service, detecting a hang-up by the caller prior to connection to the detected dialed telephone number.

10. The method of claim 1, further comprising, after a connection to and hang-up from a network voicemail service, providing to the caller a notification that the call to the detected dialed telephone number was not completed.

11. The method of claim 1, further comprising, after a connection to and hang-up from a network voicemail service, connecting the caller to the detected dialed telephone number.

12. The method of claim 1, further comprising, after concluding a connection to a network voicemail service, setting-up the call to the detected dialed telephone number.

13. The method of claim 1, further comprising, after concluding a connection to the detected dialed telephone number, providing to the caller a voicemail status notification.

14. The method of claim 1, further comprising, if a new voicemail message was received during a call to the detected dialed telephone number, after completion of the call, providing to the caller a voicemail status notification.

15. The method of claim 1, further comprising, if a new voicemail message was received during a call to the detected dialed telephone number, after completion of the call, ringing the caller, and upon connecting with the caller, providing a voicemail status notification.

16. The method of claim 1, wherein the voicemail status notification is provided without utilizing an SMDI link.

17. The method of claim 1, wherein the voicemail status notification includes a messaging party name.

18. The method of claim 1, wherein the dialed telephone number is not a telephone number of a network voicemail service.

19. A system for providing a voicemail status notification, the system comprising:
a network switch configured to detect, via a public switched telephone network, a dialing of a telephone number by a caller, wherein the telephone number is not a calling-card number or a voicemail number; and
a network adjunct configured to provide to the caller the voicemail status notification after detecting the dialing of the telephone number and prior to setting up a call to the telephone number.

20. A method for receiving a voicemail status notification, the method comprising:
receiving, via the public switched telephone network, the voicemail status notification after placing a telephone call via a public switched telephone network and prior to setting up a call to the telephone number, wherein the telephone number is not a calling-card number or a voicemail number.

21. A processor-readable medium storing processor-executable instructions, which when loaded in and executed by a processor, cause the processor to perform activities comprising:
providing to a caller a voicemail status notification, wherein the voicemail status notification is provided to the caller after detecting, via a public switched telephone network, a dialing of a detected dialed telephone number by the caller, wherein the detected dialed telephone number is not a calling-card number or a voicemail number, and wherein the voicemail status notification is provided prior to setting up a call to the detected dialed telephone number.

* * * * *